US008954376B2

(12) United States Patent
Mandelstein et al.

(10) Patent No.: US 8,954,376 B2
(45) Date of Patent: Feb. 10, 2015

(54) DETECTING TRANSCODING TABLES IN EXTRACT-TRANSFORM-LOAD PROCESSES

(75) Inventors: Dan J. Mandelstein, Austin, TX (US); Ivan M. Milman, Austin, TX (US); Martin Oberhofer, Bonndorf (DE); Sushain Pandit, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 13/415,018

(22) Filed: Mar. 8, 2012

(65) Prior Publication Data

US 2013/0238550 A1 Sep. 12, 2013

(51) Int. Cl.
*G06F 7/00* (2006.01)

(52) U.S. Cl.
USPC .......................................... 707/602

(58) Field of Classification Search
USPC ............ 707/602, 692, 690, 601, 999.006
See application file for complete search history.

(56) References Cited

U.S. PATENT DOCUMENTS

| | | | |
|---|---|---|---|
| 4,866,445 A * | 9/1989 | Valero et al. ................. 341/106 |
| 6,339,775 B1 * | 1/2002 | Zamanian et al. .................... 1/1 |
| 7,254,590 B2 * | 8/2007 | Mudunuri et al. .................... 1/1 |
| 7,305,419 B1 | 12/2007 | Cosby et al. |
| 2005/0027683 A1 * | 2/2005 | Dill et al. ......................... 707/2 |
| 2006/0235899 A1 * | 10/2006 | Tucker ......................... 707/200 |
| 2006/0253476 A1 * | 11/2006 | Roth et al. .................... 707/100 |
| 2007/0011134 A1 * | 1/2007 | Langseth et al. .................. 707/1 |
| 2008/0222634 A1 | 9/2008 | Rustagi |
| 2008/0281824 A1 * | 11/2008 | Rangadass et al. ............... 707/8 |
| 2009/0287628 A1 * | 11/2009 | Indeck et al. .................... 706/47 |
| 2009/0319544 A1 * | 12/2009 | Griffin et al. ................. 707/100 |
| 2010/0094910 A1 * | 4/2010 | Bayliss ......................... 707/800 |
| 2010/0114841 A1 | 5/2010 | Holenstein et al. |
| 2010/0205044 A1 | 8/2010 | Scheer |
| 2010/0281061 A1 * | 11/2010 | Chen ............................. 707/794 |
| 2011/0029546 A1 * | 2/2011 | Mineno et al. ................ 707/756 |
| 2011/0055147 A1 | 3/2011 | Joerg et al. |
| 2011/0066590 A1 * | 3/2011 | Chang et al. .................. 707/602 |
| 2011/0106821 A1 * | 5/2011 | Hassanzadeh et al. ....... 707/749 |
| 2011/0140937 A1 * | 6/2011 | Lai et al. ......................... 341/51 |
| 2011/0270866 A1 * | 11/2011 | Dettinger et al. ............. 707/769 |
| 2012/0030202 A1 * | 2/2012 | B'Far et al. .................... 707/737 |
| 2012/0330911 A1 * | 12/2012 | Gruenheid et al. ........... 707/694 |

OTHER PUBLICATIONS

PolarLake, How can you leverage your Reference Data to reduce operational risk and costs?, Jan. 2007, PolarLake, New York, New York, United States.

(Continued)

*Primary Examiner* — Mohammed R Uddin
(74) *Attorney, Agent, or Firm* — Patterson & Sheridan, LLP

(57) ABSTRACT

Techniques are disclosed for identifying transcoding tables in an Extract-Transform-Load (ETL) process, by identifying, by operation of one or more computer processors, records passing through an operator configured to replace values in the records with values from at least one table linked to the operator before being sent to an output table, wherein the operator specifies an operation for extracting, transforming, or loading data stored in one or more source systems into storage by a target system, and evaluating at least a first table linked to the operator to determine whether the first table is a transcoding table by assigning a score to the first table, wherein the score is indicative of the likelihood that the first table is a transcoding table, wherein a transcoding table is used to harmonize values from a plurality of tables in the one or more source systems to a table in the target.

18 Claims, 8 Drawing Sheets

(56) References Cited

OTHER PUBLICATIONS

Bechhofer, Sean, OWL Web Ontology Language Parsing OWL in RDF/XML, Jan. 2004, W3C, <http://www.w3.org/TR/owl-parsing/>.

Buckley, Warren, Financial and Reference data Management Industry Insights: Why ETL just isn't good enough for Reference data Distribution, Sep. 2011, PolarLake, <http://www.polarlake.com/industry-insights/article/why_etl__just_isnt_good_enough_for_reference__data__distribution>.

Mandelstein, Dan J. et al., "A Method to Detect Reference Data Tables and Transcoding Tables in ETL Processes", U.S. Appl. No. 13/415,047, filed Mar. 8, 2012.

* cited by examiner

| TABLE | TOTAL RESULT SCORE | TRANSCODING? | | LOAD? |
|---|---|---|---|---|
| | | YES | NO | |
| $T_1$ | 100 | ● | ○ | ☑ |
| $T_2$ | 99 | ○ | ● | ☐ |
| $T_3$ | 88 | ● | ○ | ☑ |
| $T_4$ | 80 | ● | ○ | ☑ |
| $T_N$ | 40 | ○ | ● | ☐ |

RESET    SUBMIT

FIG. 8

DETECTING TRANSCODING TABLES IN EXTRACT-TRANSFORM-LOAD PROCESSES

BACKGROUND

Embodiments disclosed herein provide techniques for detecting transcoding tables in Extract, Transform, and Load (ETL) processes.

ETL processes are implemented in programs organized in project folders for a data integration solution. Thus, the installation of data integration software might have one or multiple processes with one or multiple jobs grouped into each of the processes. ETL processes typically integrate data from multiple, heterogeneous data sources into a central repository, such as a data warehouse (DW) or a master data management (MDM) system. Reference data generally defines a set of values that describes other data. Some examples of reference data are: gender, country codes, courtesy titles (Mr., Mrs., Miss, Dr., etc.), units of measure, and so on. Reference data can be found in applications by code tables, lookup tables, properties files, or it may be hard-coded. Consistent reference data is the cornerstone of many information centric applications such as data warehousing, master data management (MDM), as well as in operational business applications such as customer relationship management (CRM) and enterprise resource planning (ERP). Without consistent reference data, many business problems can occur. For example, in DW environments, revenue reports by country and customer type, created using reference data describing these entities, may produce incorrect results due to the inconsistent reference data. In MDM environments, product categorization may produce unexpected results, and customer information cannot be established, without consistent reference data for each type of entity.

Reference Data Management (RDM) systems have emerged to ensure consistency of reference data across applications and between enterprises. RDM systems vary from implementation to implementation, but generally an RDM solution provides a single place for business owners to create, update, review and distribute reference data across an enterprise.

Reference data management solutions are particularly useful in data integration projects. Typically, at any given point in time in medium to large enterprises, there are one or more data integration projects being implemented to, for example, add additional sources to a data warehouse and standardize data from multiple legacy systems prior to integration into business management applications.

In many ETL processes, reference data must be transcoded from source reference data values to target reference data values, such that reference data is harmonized in the target system upon completion of the process. Transcoding is needed where one or more code values in the source system has a different meaning in the target system, or where the code values for the same meaning are different in the source and target system. Both issues are addressed by implementing transcoding tables which harmonize the reference data while data is exchanged between one or more source and target systems. Reference data is also used in every ETL process in order to validate data in order to ensure its "loadability" into the target against transcoding tables from the target.

SUMMARY

Embodiments disclosed herein provide a computer-implemented method, a computer program product, and a system for identifying transcoding tables in ETL processes, by identifying, by operation of one or more computer processors, records passing through an operator configured to replace values in the records with values from at least one table linked to the operator before being sent to an output table, wherein the operator specifies an operation for extracting, transforming, or loading data stored in one or more source systems into storage by a target system, and evaluating at least a first table linked to the operator to determine whether the first table is a transcoding table by assigning a score to the first table, wherein the score is indicative of the likelihood that the first table is a transcoding table, wherein a transcoding table is used to harmonize values from a plurality of tables in the one or more source systems to a table in the target system.

BRIEF DESCRIPTION OF THE DRAWINGS

So that the manner in which the above recited aspects are attained and can be understood in detail, a more particular description of embodiments disclosed herein, briefly summarized above, may be had by reference to the appended drawings.

It is to be noted, however, that the appended drawings illustrate only typical embodiments of the disclosure and are therefore not to be considered limiting of its scope, for the disclosure may admit to other equally effective embodiments.

FIG. 8 illustrates an exemplary graphical user interface (GUI) screen displaying an exemplary list of candidate transcoding tables presented to a user, according to one embodiment disclosed herein.

DETAILED DESCRIPTION

Figure 1:
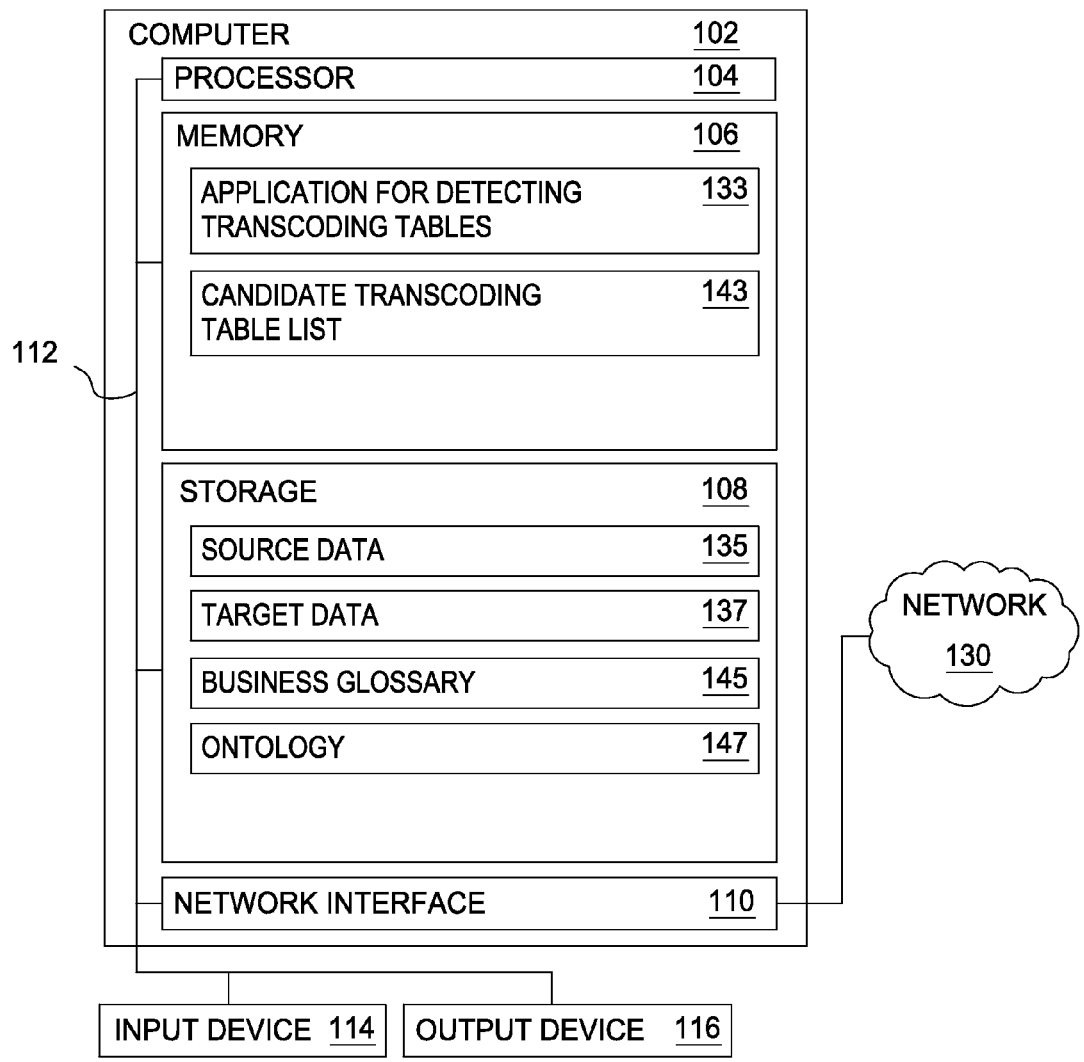
FIG. 1 is a block diagram illustrating a system for detecting transcoding tables in an ETL process, according to one embodiment disclosed herein.

Embodiments of the disclosure provide techniques for detecting transcoding tables in ETL processes. In one embodiment, an application may be configured to analyze a plurality of operators in an ETL process to determine whether records passing through the operator have values being replaced by values from at least one table linked to the operator. The application then analyzes the at least one table to determine whether it is a transcoding table. The application then assigns a score to the at least one table, wherein the score is indicative of the likelihood that the table is a transcoding table. After analyzing the tables, the application presents a graphical user interface which lists each table and its respective score. The user may then mark each table as a transcoding table or not. The application may then, upon user approval, load the tables marked as transcoding tables into a data store. In some embodiments, if the assigned score exceeds a specified threshold, the at least one table is automatically loaded into a data store without being presented to the user for approval. In some embodiments, the data store is a reference data management system.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments disclosed herein may take the form of a computer program product embodied in one or more computer readable medium(s) having computer readable program code embodied thereon.

Any combination of one or more computer readable medium(s) may be utilized.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments disclosed herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments disclosed herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In the context of embodiments disclosed herein, a user may access applications to detect transcoding tables or related data available in the cloud. For example, the application for detecting transcoding tables in an ETL process could execute on a computing system in the cloud and detect transcoding tables in ETL processes. In such a case, the application for detecting transcoding tables in an ETL process could detect and score candidate transcoding tables and store results of each candidate transcoding table at a storage location in the cloud for user review. Doing so allows a user to access this information from any computing system attached to a network connected to the cloud (e.g., the Internet).

As described above, reference data tables in most cases are tables into which an enumerated set of possible values of a certain field data type are divested. A sample reference data table is provided for illustration:

| PK | Country_Code | Country_Description |
|----|--------------|---------------------|
| 1  | UK           | United Kingdom      |
| 2  | US           | United States       |
| 3  | ...          | ...                 |

The sample reference data table contains primary key (PK), Country_Code, and Country_Description columns. The reference data table provides a mapping between Country_Code and Country_Description. A problem arises when different source systems have different mappings (e.g. "USA" for United States, conflicting with "US" above). Reference data loaded into an ETL process from tables with different reference data table entries will produce inconsistent and unreliable results, as described above. Transcoding tables have been implemented to address this problem, by harmonizing reference data while data is exchanged between one or more source and target systems. A sample transcoding table is provided for illustration:

| PK | Source_ID | Source_Value | Source_Description | Target_ID | Target_Value | Target_Description |
|----|-----------|--------------|---------------------|-----------|--------------|--------------------|
| 1  | 1         | UK           | United Kingdom      | 1         | 1            | United Kingdom     |
| 2  | 1         | US           | United States       | 2         | 2            | United States      |
| 1  | 2         | USA          | United States of America | 2    | 2            | United States      |
| 2  | 2         | ENG          | England             | 1         | 1            | United Kingdom     |
| 3  | 2         | GER          | Germany             | 3         | 3            | Germany            |

This sample transcoding table contains a plurality of columns which are used to ensure that reference data validated against it will be transformed in an ETL process to the same target values. For example, while having two Source_Value and Source_Descriptions related to the same country (e.g., US/United States and USA/United States of America), the transcoding table provides a single, common Target_Value of "2" and a single, common Target_Description of "United States" for each of these two entries. Thus, reference data being transformed in an ETL process will be output in a consistent manner before being loaded into the destination system.

A job in an ETL process may comprise multiple operations to be performed by using operators on the data in the ETL process. Exemplary operators include a SPLIT operator, a FILTER operator, a PROJECTION operator, and a JOIN operator. The operators are independent of any specific ETL platform, and their particular configuration in the ETL process determines the modifications made to data being operated on.

FIG. 1 is a block diagram illustrating a system 100 for detecting transcoding tables in an ETL process, according to one embodiment disclosed herein. The system 100 includes a computer 102, which may be a server. The computer 102 may be connected to other computers via a network 130. In general, the network 130 may be a telecommunications network and/or a wide area network (WAN). In a particular embodiment, the network 130 is the Internet.

In another embodiment, the system of a common data integration platform such as an IBM® InfoSphere® Information Server can be installed also across multiple servers representing a single processing system exploiting the hardware resources of several servers. In such an environment, a single job might use resources on one or several servers. (IBM and InfoSphere are trademarks of International Business Machines Corporation, registered in many jurisdictions worldwide.)

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows operating system, and distributions of the Linux operating system. (UNIX is a registered trademark of The Open Group in the United States and other countries. Linux is a registered trademark of Linus Torvalds in the United States, other countries, or both. Microsoft and Windows are trademarks of Microsoft Corporation in the United States, other countries, or both.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, removable memory cards, optical storage, flash memory or solid state storage devices (SSD). The memory 106 and the storage 108 may be part of one virtual address space spanning multiple primary and secondary storage devices. In some embodiments, storage 108 is a storage area network (SAN) with one or multiple file systems.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an application 133 for detecting transcoding tables. That is, the application 133 may generally be configured to detect transcoding tables in one or more projects for a data integration solution. As described above, the jobs and programs in these projects typically integrate data from multiple, heterogeneous data sources into a central repository such as a data warehouse. Thus, in one embodiment, the application 133 may be configured to detect transcoding tables when the ETL process integrates data from multiple sources into a data warehouse. As shown, memory 106 also contains candidate transcoding table list 143. Candidate transcoding table list 143 is a list of tables from which values are used to replace values in records passing through an adjacent operator. The tables listed in candidate transcoding table list 143 are tables which may be transcoding tables, but further analysis is required before making such a determination. The data stored in candidate transcoding table list 143 may take any form suitable to identify each table, and may further include at least a collection of data related to the table, schema, and database, such as whether the table is persistent or non-persistent, a schema information, record counts, whether the table is defined as a reference table in a business glossary, a maximal value partition and one or more scores. Candidate transcoding table list 143 may itself take many forms, including, but not limited to, a table in a database, an XML data file, or a text file.

As shown, storage 108 contains source data 135, target data 137, business glossary 145, and ontology 147 according to an embodiment disclosed herein. In some embodiments, the storage which contains the source data 135 and target data 137 are attached to the servers running the source and target applications. In some embodiments, the storage containing the business glossary and the ontology might also be attached to a different server then the one(s) used by the data integration software. Source data 135 is the data being operated on by the ETL process, and target data 137 is the resulting output of the ETL process. Business glossary 145 allows users to create and manage an enterprise vocabulary and classification system using a domain-specific collection of industry standard terms and definitions. Thus, a business glossary may define a particular business asset as being a transcoding table. Alternatively, the business glossary may define the asset as being part of a source or target data system, or the asset may be related to a host that is residing on a source or target system. An exemplary business glossary is the IBM InfoSphere Business Glossary product. Ontology 147 is a general purpose ontology, which provides the structural framework for organizing information. An ontology formally represents knowledge as a set of concepts within a domain, and the relationships between those concepts. Thus, an organization may define, in an ontology, transcoding tables, and provide links to related entities. The configuration depicted in FIG. 1 is merely exemplary, as source data 135, target data 137, business glossary 145, and ontology 147 may be stored on the same computer, different computers, or any combination thereof.

Figure 2:
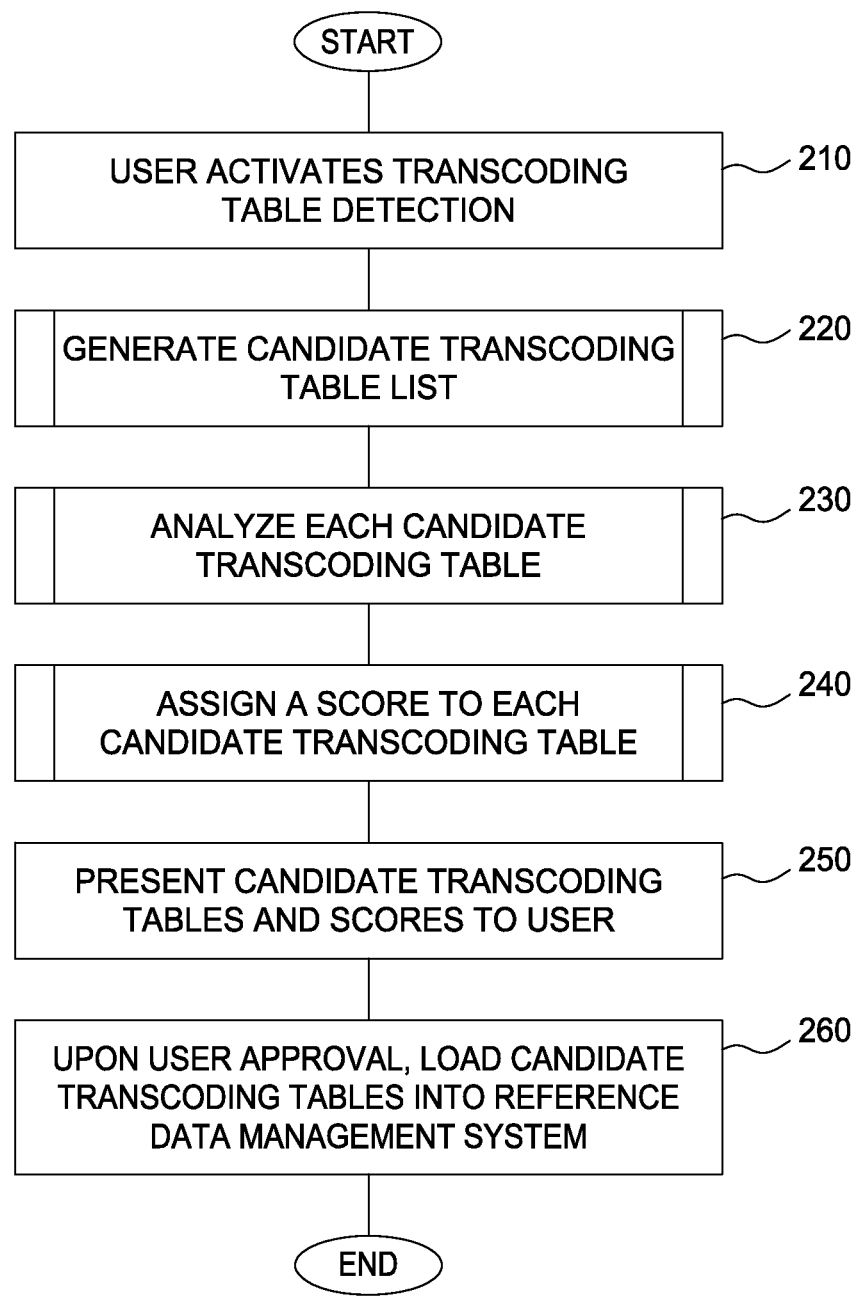
FIG. 2 is a flowchart depicting a method for detecting transcoding tables in an ETL process, according to one embodiment disclosed herein.

FIG. 2 is a flowchart depicting a method 200 for detecting transcoding tables in an ETL process, according to one embodiment disclosed herein. In one embodiment, the application 133 performs the steps in method 200. The method begins at step 210, where a user activates transcoding table detection during an ETL process. The activation may be for a specified period of time, or until completion of the ETL process. At step 220, the application 133 generates a list of candidate transcoding tables. Candidate transcoding tables are those tables which may be transcoding tables, but further examination and analysis is required before such a determination can be made. At step 230, the application 133 analyzes each candidate transcoding table. At step 240, the application 133 assigns a weighted score to each candidate transcoding table. The score generated at step 240 reflects the likelihood that the candidate transcoding table is indeed a transcoding table. At step 250, the application 133 presents each candidate transcoding table and its associated score to a user, who marks each candidate transcoding table as being a transcoding table or not. In some embodiments, if the score exceeds a certain threshold, the candidate transcoding table may be marked as transcoding table automatically. At step 260, the application 133, upon receiving user approval, loads each candidate transcoding table marked as a transcoding table by the user (or if marked automatically by exceeding a certain threshold for the score) into the reference data management system for execution.

Figure 3:
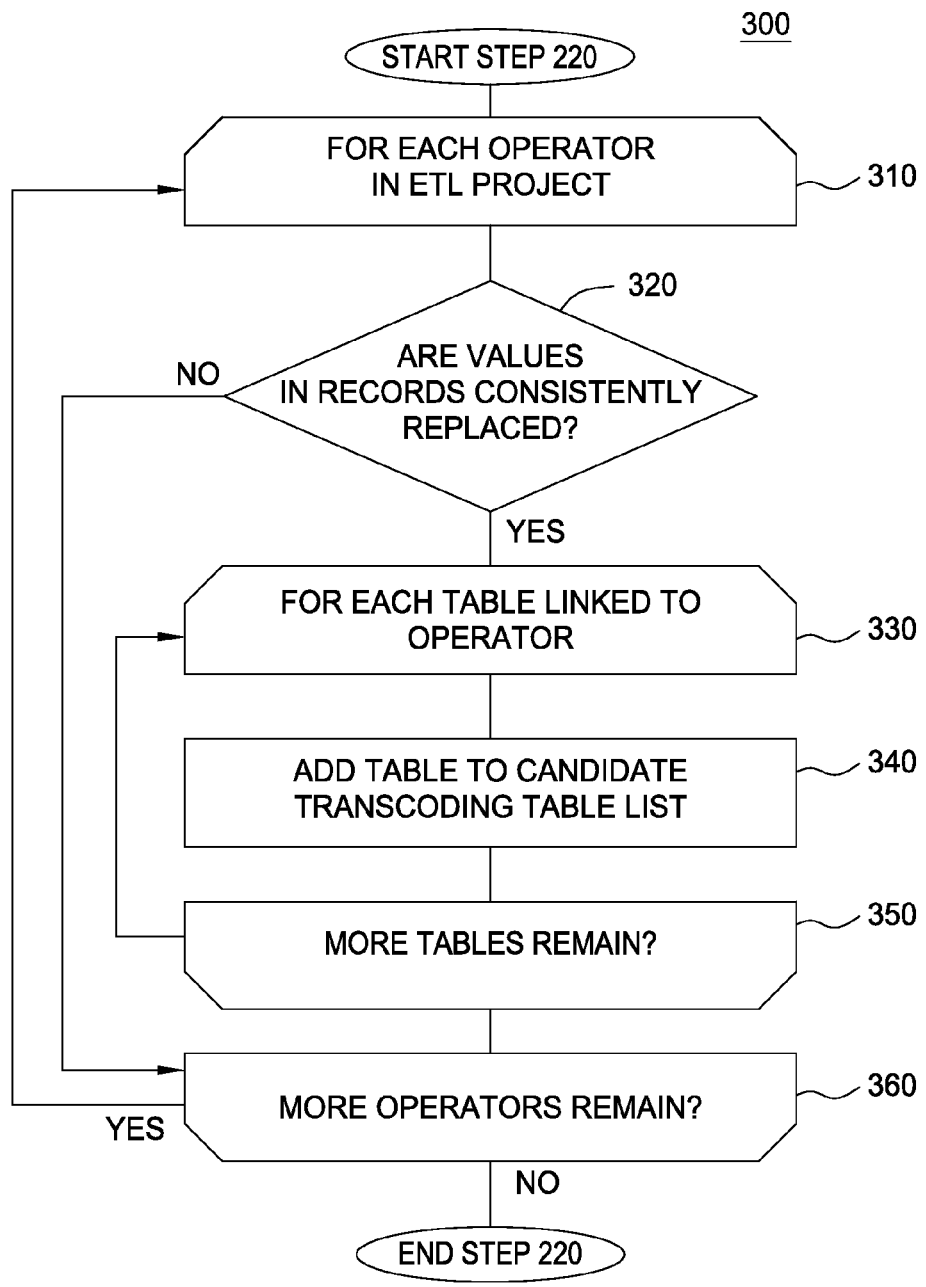
FIG. 3 is a flowchart depicting a method for identifying candidate transcoding tables in an ETL process, according to one embodiment disclosed herein.

FIG. 3 is a flowchart depicting a method 300 corresponding to step 220 for identifying candidate transcoding tables in an ETL process, according to one embodiment disclosed herein. In one embodiment, the application 133 performs the steps in method 300. At step 310, the application 133 executes a loop which includes steps 320-360 to identify candidate transcoding tables in an ETL process. The application 133 executes the loop for each operator in the ETL process. At step 320, the application 133 examines each record going into the operator to determine if values in the record are being consistently replaced by values from another table linked to the operator before being sent to the output table in target data 137. This detection is possible because each input column from the input table, if passed to the output table, has a "wire" to the output column in the output table. Based on operator metadata, a mapping between input and output columns can be created. Thus, if the value in a column for an input record is different in the output column of the same record, the operator must have caused the change. With this information, searching tables linked to the operator and for values in these tables, the replacement pattern can be seamlessly discovered. If application determines that values in the records are being replaced by values from a table linked to the operator, the application 133 proceeds to step 330. Otherwise, the application 133 proceeds to step 360. At step 330, the application 133 executes a loop which includes steps 340-350 for identifying candidate transcoding tables in an ETL process. The loop is executed for each table linked to the operator identified at step 320. At step 340, the application 133 adds the table to candidate transcoding table list 143. At step 350, the application 133 determines whether more tables remain to be added to the candidate transcoding table list 143. If more tables remain, the application 133 returns to step 330, otherwise, the application 133 proceeds to step 360. At step 360, the application 133 determines if more operators remain to be examined in the ETL process. If more operators remain, the method returns to step 310. If no operators remain, the method ends.

Figure 4:
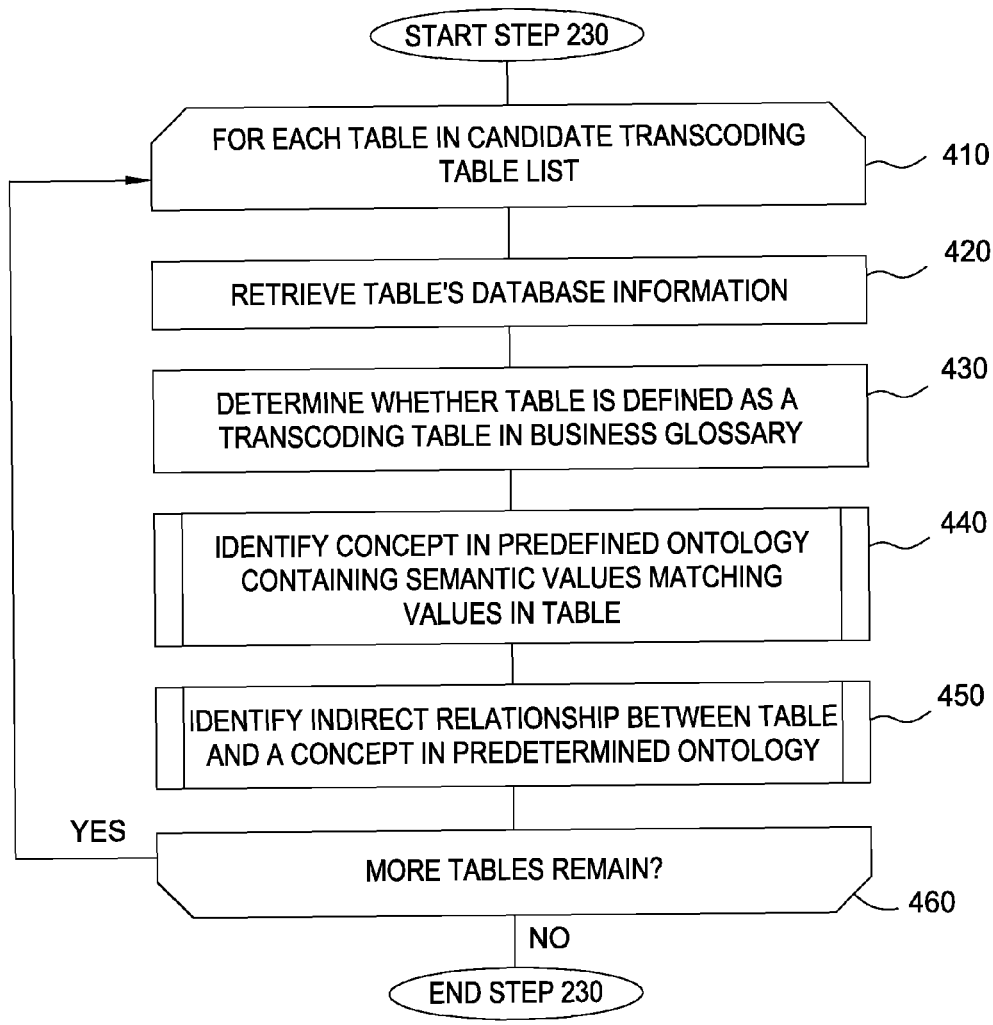
FIG. 4 is a flowchart depicting a method for determining whether a candidate transcoding table is a transcoding table, according to one embodiment disclosed herein.

FIG. 4 is a flowchart depicting a method 400 corresponding to step 230 for analyzing candidate transcoding tables, according to one embodiment disclosed herein. The method begins at step 410, where the application 133 executes a loop which includes steps 420-460 for analyzing each table in candidate transcoding table list 143. Although a complete for loop is depicted, embodiments disclosed herein may perform one, several or all of the steps 430-450 in executing method 400. Steps 430-450 generally include heuristics which, if satisfied, indicate a greater likelihood that the table is a transcoding table. At step 420, the application 133 retrieves information related to the database storing the table. Such information includes, but is not limited to, database, schema, and table names, record counts, and column names. At step 430, the application 133 searches business glossary 145 for the table in candidate transcoding table list 143, using the information retrieved at step 420. If the table is found, the application 133 checks to determine whether the table is defined as a transcoding table. Such a definition may definitively indicate that the table is a transcoding table (at least within a given business domain). After searching the business glossary 145, the application 133 updates the entry for the table in candidate transcoding table list 143 to indicate whether the table is defined as a transcoding table in the business glossary. Examples of the indication in candidate transcoding table list 143 include, but are not limited to, a textual string and a Boolean value.

Figure 6:
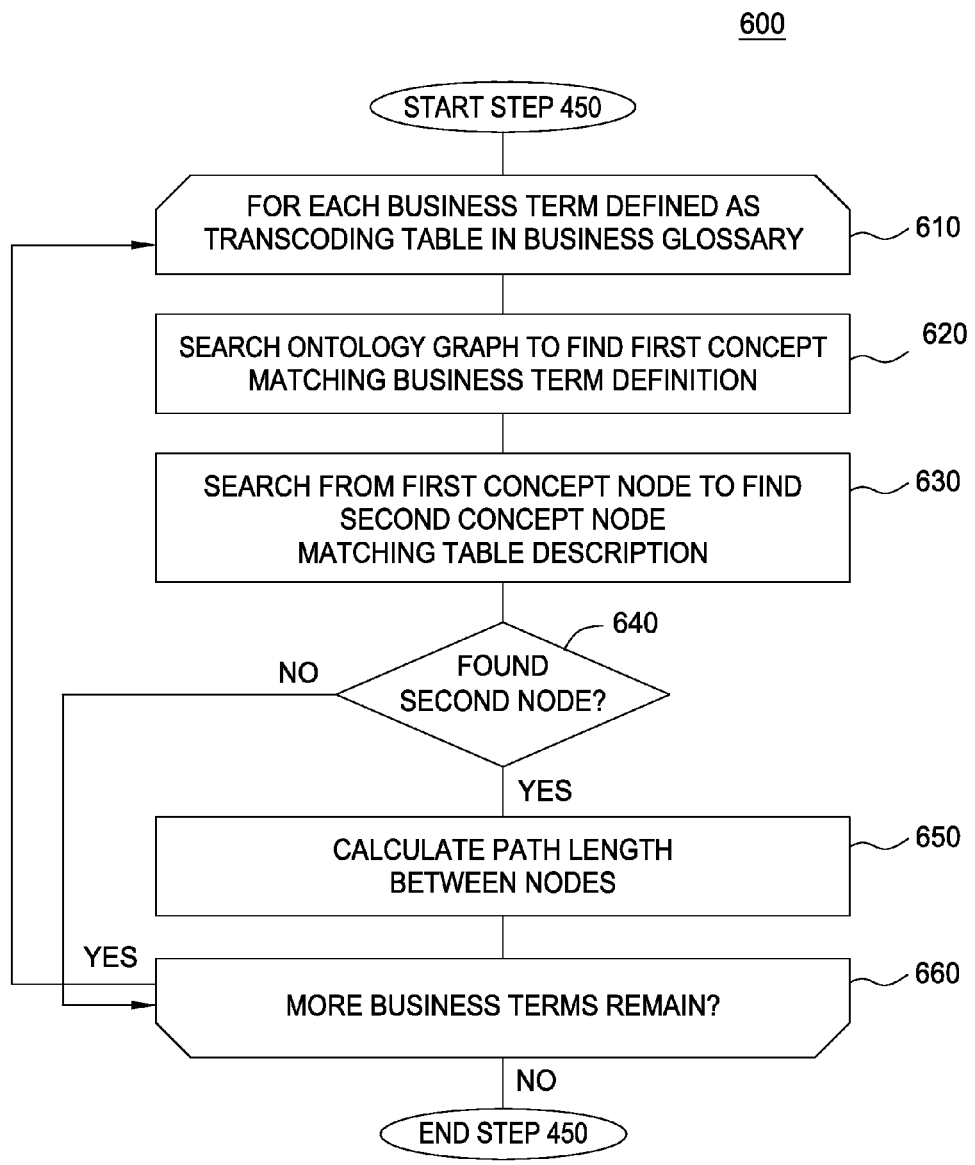
FIG. 6 is a flowchart depicting a method for detecting an indirect relationship between a table and a concept in an ontology, according to one embodiment disclosed herein.
Figure 7:
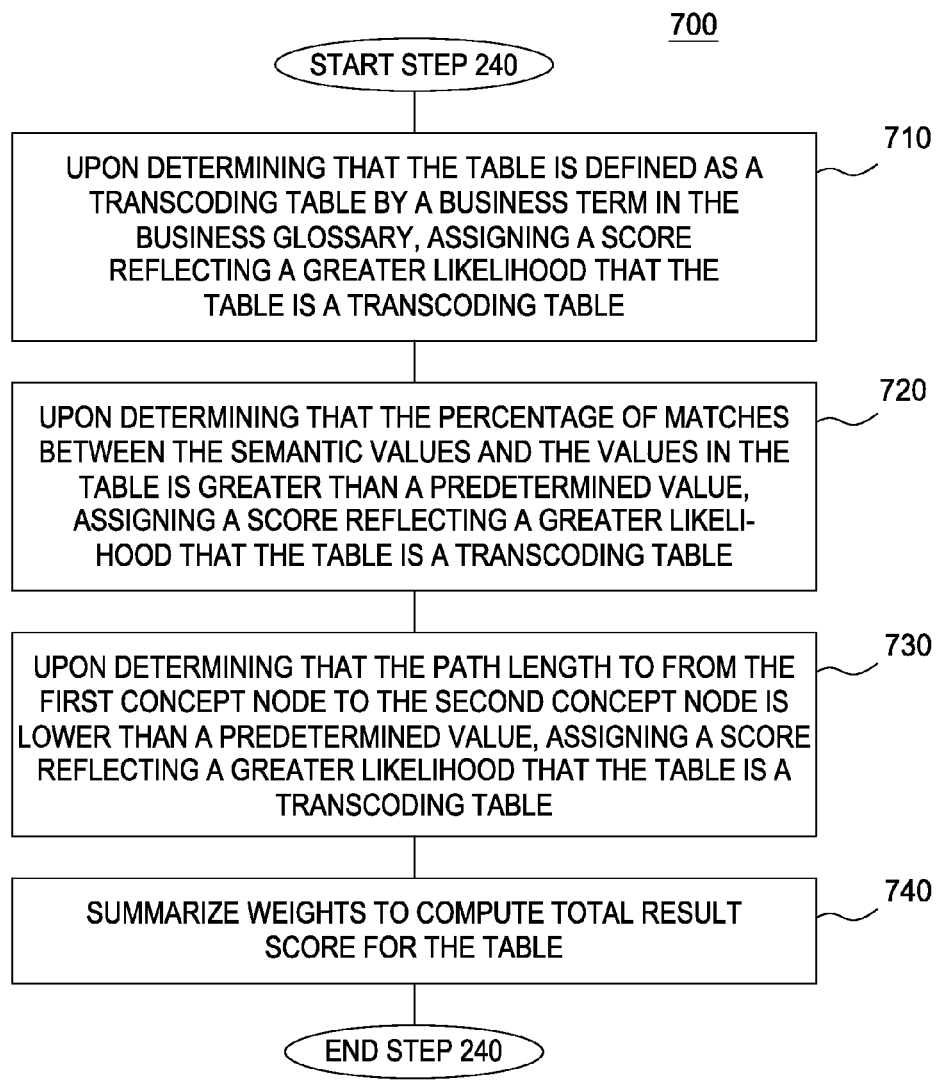
FIG. 7 is a flowchart depicting a method for a method for scoring candidate transcoding tables, according to one embodiment disclosed herein.

The application 133 may attempt to leverage ontology 147 and its representation of the domain of source data 135 models to validate the table as a transcoding table. At step 440, the application 133 attempts to identify a concept in ontology 147 containing semantic values matching values in the table. In some embodiments, at step 440, the application 133 calculates a potential maximal value partition, $\{N, D_k\}$ corresponding to the table. FIG. 6, described below, provides an example of calculating a maximal value partition. The resulting maximal value partition is used to calculate a score for the table based on the shared number of reference data column elements that $D_k$ contains. FIG. 7, described below, provides an example of calculating a score based on a maximal value partition. If N is not null, the maximal value partition $\{N, D_k\}$ and its values may be stored in the entry for the table in candidate transcoding table list 143.

Figure 5:
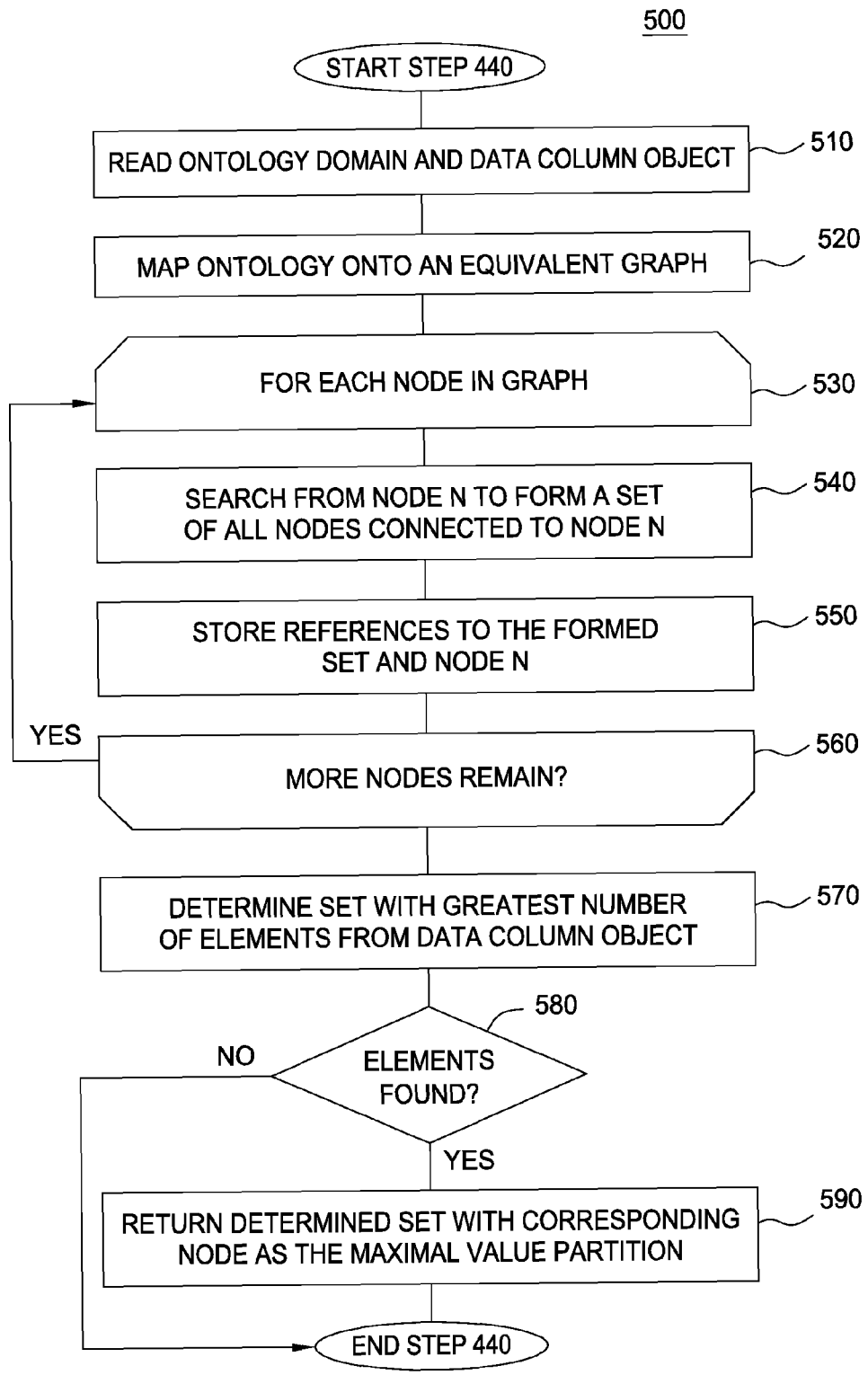
FIG. 5 is a flowchart depicting a method for calculating a maximal value partition, according to one embodiment disclosed herein.

At step 450, the application 133 attempts to identify an indirect relationship between the table and a concept in the ontology. FIG. 5, described in detail below, provides an example of identifying an indirect relationship between the table and a concept in the ontology. If the application 133 detects an indirect relationship, the distance between the two discovered nodes in the ontology is saved to the entry for the table in candidate transcoding table list 143. Based on this distance, the application 133 may calculate a score as described in reference to FIG. 7.

At step 460, the application 133 determines whether more tables remain to be examined. If more tables remain, the application 133 returns to step 410. Otherwise, the method 400 terminates.

FIG. 5 is a flowchart depicting a method 500 corresponding to step 440 for identifying a concept in ontology 147 containing semantic values matching values in the table by computing a maximal value partition. In one embodiment, the application 133 performs the steps in method 500. Method 500 leverages the notion of value partitions in ontologies to discover a class concept that is being partitioned by a set of disjoint classes, which represent concepts for the values present in the description column (C) from a candidate transcoding table. In any domain representation, there are many "attributes," or "modifiers" that are used to describe other concepts. These attributes often take a value from a set of candidate values (enumeration, etc). For these purposes, in ontology modeling, there are mechanisms to specify a "collection of values." One may assume that these collections of values represent the data columns present in transcoding tables. For a class concept N captured in an ontology O, we define a value-partition, V, to be a set of classes $N_i$, such that $N=Union (N_i)$ such that all $N_i$ are disjoint. This essentially partitions the class N into $N_i$ partitions, and thus V is a partitioning of N. Other embodiments may call this an "enumeration," a "partition," or a "set." Further, we define a maximal value partition, V', in an ontology O with respect to a set D as the value partition that contains the maximum elements from set D.

With this background, the following method 500 for identification of V' for a column $C=\{C_i\}$ of the table may be used. The method begins at step 510, where the application 133 reads domain ontology O and the column $C=\{C_i\}$. The method then calculates the maximal value partition, V', in the ontology O with respect to the set C as follows.

We assume OWL-Lite conventions in this algorithm; therefore there exists a corresponding RDF graph for an ontology. OWL-Lite is a sublanguage of the OWL Web Ontology Language, which is a knowledge representation language for authoring ontologies (see more at http://www.w3.org/TR/owl-features/, which is incorporated herein by reference). Therefore, at step 520, the application 133 maps ontology O to equivalent RDF graph G. At step 530, a loop containing steps 540-560 is executed, where for each node N in the graph, the application 133 generates a set of nodes connected to the current node N in the graph is generated. The loop begins at an arbitrary node N and executes until all nodes are visited. At step 540, the application 133 searches from selected node N and forms a set of all nodes connected to selected node N. To determine the set of nodes connected to the selected node N, the application 133 performs a search (breadth-first, depth-first, or a similar variant) from the selected node N and expands all the nodes that are directly connected to N. At step 550, the application 133 stores references to both the set and selected node N. In one embodiment, application puts the set and the selected node in a set $D_N$. At step 560, the application 133 determines whether more nodes in the ontology graph remain to be searched. If more nodes remain, the application 133 returns to step 530. Otherwise, the application 133 proceeds to step 570.

At step 570, the application 133 compares the sets of nodes with the data column object C and determines the set with the greatest number of elements from C. The application 133 compares C with $\{D_i\}$, for all i, and determines the set $D_k$ with the greatest number of elements from the set C. At step 580, the application 133 determines if any elements of C were found. If none of the elements were found, null is returned and the method terminates. If elements are found, the application 133 proceeds to 590, where the application 133 returns the determined set with the corresponding selected node as the maximal value partition. Here, the application 133 defines N as the class concept corresponding to the node k, and returns {N, D$_k$} as the maximal value partition and the actual contents of the partition.

To understand the method 500, a column is presented from an exemplary transcoding table with the following set of data values {c$_i$}:

| |
|---|
| UNITED STATES |
| UNITED KINGDOM |
| GERMANY |

Consider an OWL-lite enterprise ontology which captures relationships and knowledge specific to the data model for the source. Assume that in the ontology graph, class concepts for Germany, United Kingdom and United States are defined subclasses of the concept CountrySetA. Since in the example ontology, we only have these three countries as subclasses of CountrySetA, we can safely say that the concept CountrySetA has been exhaustively partitioned by Germany, United Kingdom and United States and they form a value-partition of CountrySetA.

Referring back to the source description column above, we observe that out of the data values, we can find three (Germany, United Kingdom and United States) in the value partition present in the ontology. Assuming that we cannot find any other value-partition that contains more than these three data values, we then say that the above value-partition is maximal. However, if we could find another value-partition that contained four countries from the given column, then we would identify that one as maximal.

Since the domain of the source data model might change over time (in turn changing the domain ontology), we need a way to scale this approach and not require to recompute the value partitions all over again. One of the ways to overcome this exponential complexity would be to pre-compute the value partitions and then cache them for further reference. Then, we could perform a partial evaluation whenever the ontology changes. Another alternative would be to have this knowledge encoded at the time the ontology is being crafted. Thus, it would be the responsibility of the steward or the creator to update the list of value partitions as he adds new knowledge. For example, if one adds a new country (Greece) to the domain of an ontology, we don't have to recompute every single value partition, we could just add a concept Greece to the pre-existing and catalogued value-partition pertaining to European countries.

FIG. 6 is a flowchart depicting a method 600 corresponding to step 450 for detecting an indirect relationship between a table in candidate transcoding table list 143 and a concept in an ontology, according to one embodiment disclosed herein. In one embodiment, the application 133 performs the steps in method 600. The method begins at step 610, where, for each term in business glossary 145 defined as a transcoding table, the application 133 executes a loop which includes steps 620-660 for detecting an indirect relationship between a table and a concept in ontology 147. At step 620, the application 133 searches the graph of ontology 147 to find a first concept node matching the business term definition. At step 630, the application 133 searches from the first concept node to find a second concept node matching the table metadata. In some embodiments, the table metadata is the table's schema name retrieved at step 420. At step 640, application 133 determines whether a second concept node was found. If a second concept node was not found, the application 133 proceeds to step 660. If a second concept node is found, the application 133 proceeds to step 650, where the application 133 calculates the path length between the first and second nodes, and stores the path length in the entry in candidate transcoding table list 143 corresponding to the table. At step 660, the application 133 determines whether other business terms remain to be searched. If yes, the application 133 returns to step 610; otherwise, the method terminates.

FIG. 7 is a flowchart depicting a method 700 corresponding to step 240 for scoring candidate transcoding tables, according to one embodiment disclosed herein. In one embodiment, the application 133 performs the steps in method 400. As is recognized by one skilled in the art, in alternate embodiments, a score may be assigned using the following methods during execution of method 400. While FIG. 7 is depicted as a flowchart, embodiments disclosed herein contemplate using one, several, or all of the scoring methods depicted therein to score a candidate transcoding table in list 143. The scoring methods can take any suitable form to indicate that one table may have a greater likelihood than another that the table is a transcoding table. In some embodiments, the scores may be numeric, for example in a range of 0-1, 0-10, 0-100, or any suitable range. Embodiments disclosed herein contemplate all scoring methods. In embodiments where more than one scoring method is utilized, a single score may be updated by each subsequent method or a score for each method may be recorded. In embodiments where multiple scores are recorded, the score assigned to the table to be presented to the user may be a composite of each score, or each individual score may be presented. The composite may be weighted to place more importance on different scoring methods, or may be an average of each score. In other embodiments, if scores from certain scoring methods indicate a greater likelihood that the table is a transcoding table, scores from other scoring methods may be disregarded in generating the composite score, or the score from the method indicating a greater likelihood that the table is a transcoding table may be presented in lieu of a composite score.

At step 710, the application 133 assigns a score reflecting a greater likelihood that the table is a transcoding table upon determining that the table is defined as a transcoding table in a business glossary. Application 133 made this determination as described above in reference to step 430. In one embodiment, the application 133 verifies this determination by checking the corresponding values in the table's entry in candidate transcoding table list 143. In some embodiments, this express definition may be relied upon to form a definitive conclusion that the table is a transcoding table, and the corresponding score may be assigned to the table. In some embodiments, other scoring methods may be disregarded if the table has been defined as a transcoding table in the business glossary.

At step 720, the application 133 assigns a score reflecting a greater likelihood that the table is a transcoding table if the percentage of reference data column elements the table shares in common with the maximal value partition computed at step 440 exceeds a predetermined value. The predetermined value may be any value sufficient to establish a threshold past which the number of common elements is sufficient to reflect a greater likelihood that the table is a transcoding table. In some embodiments, the predetermined value is defined by the application 133. In other embodiments, the predetermined value is defined by a user. As stated above, the function computing maximal value partition {N, D$_k$} returns the maximal value partition as well as the actual contents of the partition. Based on this information, the application 133 may calculate a corresponding score. If N is not null, a score is assigned based on the percentage of reference data column elements (C) the table shares with D$_k$. If the elements in C are an exact match to the elements of $D_k$, a score reflecting a greater likelihood that the table is a transcoding table is assigned. In some embodiments, a score reflecting the greatest likelihood that the table is a transcoding table may be assigned if the elements in C and $D_k$ are an exact match. If $D_k$ has fewer total elements than C, or if $D_k$ has extra elements not in C, a score reflecting a lesser likelihood that the table is a transcoding table is assigned. In one embodiment, a formula for score calculation may be represented as: ({Number of matches between $D_k$ and C}/{Number of total elements in C})−0.1*({Number of mismatches between $D_k$ and C}/{Number of total elements in C}). Generally, any formula suitable for capturing these principles may be implemented. Once the application 133 has computed the score, it also saves the score in the entry associated with the table in candidate transcoding table list 143.

At step 730, the application 133 assigns a score indicating a greater likelihood that the table is a transcoding table based upon a determination that the path length from a first concept node to a second concept node in an ontology is lower than a predetermined value. Application 133 detects the nodes and calculates the path length as described above in conjunction with step 460. The predetermined value may be any value sufficient to capture the concept that the closer the two nodes are, the more closely related they are. In some embodiments, the predetermined value is defined by the application 133. In other embodiments, the predetermined value is defined by a user. Thus, if the first concept node represents a transcoding table, a second concept node linked closely to the first concept node may also represent a transcoding table. Conversely, the further the second concept node is from the first concept node, the less likely the table is a transcoding table. Therefore, by calculating the path length between the nodes, the application 133 may determine the distance between the nodes, and assign a score reflecting the likelihood that the table is a transcoding table. Application 133 compares the computed path length to the predetermined value to determine whether the path length is less than the predetermined value. If the path length is less than the predetermined value, a score indicating a greater likelihood that the table is a transcoding table is assigned. In some embodiments, the score may be computed in a manner that is inversely proportional to the computed path length. In other embodiments, the path length itself is the score. Generally, any suitable scoring method is contemplated in computing the score.

At step 740, the application 133 summarizes the scores computed at steps 710-750 to compute a single total result score for the table. In some embodiments, the scores computed at steps 710-730 are weighted to compute the total result score. In other embodiments, the scores computed at steps 710-730 are equally weighted to compute the total result score, i.e. the scores are averaged. Generally, any suitable method is contemplated in computing the total result score.

FIG. 8 illustrates an exemplary graphical user interface (GUI) screen 800 displaying an exemplary list 810 of candidate transcoding tables presented to a user, according to one embodiment disclosed herein. In one embodiment, the application 133 generates the list 810. As shown, list 810 contains a plurality of rows $815_{1-N}$ corresponding to each entry in candidate transcoding table list 143, which is identified in column 820. In column 825, a total result score associated with the candidate transcoding table is presented. As shown, the scores in column 825 are sorted in descending order, but may be sorted in any order, according to embodiments disclosed herein. Furthermore, the total result score is shown in column 825, according to an embodiment disclosed herein. In other embodiments, this score is a single score selected from one of the scores calculated in method 700. In other embodiments, this score is a single score selected from one of the scores calculated in method 700. In alternate embodiments, several or all of the scores calculated in method 700 may be presented to the user. Column 830 depicts radio buttons which accept user input as to whether the candidate transcoding table $815_{1-N}$ is a transcoding table. Embodiments disclosed herein contemplate any method of receiving input as to whether the table is a transcoding table, for example, checkboxes and drag down menus. Column 835 depicts a checkbox corresponding to each table $815_{1-N}$, in which the user specifies whether to load the table into a transcoding management system. Embodiments disclosed herein contemplate any method of receiving input as to whether to load the table into a reference data management system, for example, checkboxes and drag down menus. Element 840 is a reset button, which would clear all user input from the screen. Element 845 is a submit button, which, once clicked, will load all of the tables which have been marked as transcoding tables in column 835 into the reference data management system.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for identifying transcoding tables in an extract-transform-load (ETL) data integration process, comprising:
   activating transcoding table detection in the ETL process;
   identifying, by operation of one or more computer processors, records passing through an operator configured to replace values in the records with values from at least one table linked to the operator before being sent to an output table, wherein the operator specifies an operation for extracting, transforming, or loading data stored in one or more source systems into storage of a target system;
   adding the at least one table linked to the operator to a list of candidate tables;
   determining whether each table in the list of candidate tables is a transcoding table by assigning, to each respective table in the list of candidate tables, a score reflecting a greater likelihood that the respective table is a transcoding table upon determining at least one of:
      that a business term in a business glossary defines the respective table as a transcoding table;

that a first concept in a predefined ontology contains semantic values matching values in the respective table; and that an indirect relationship exists between the respective table and a second concept in the ontology;

wherein the transcoding table is used to harmonize values from a plurality of tables in the one or more source systems to a table in the target system.

2. The computer-implemented method of claim 1, further comprising:

upon determining that the respective table is a transcoding table based on the score exceeding a predetermined threshold, loading the respective table into a data store.

3. The computer-implemented method of claim 1, further comprising:

presenting the respective table to a user; and upon receiving user input specifying that the respective table is a transcoding table, loading the respective table into a data store.

4. The computer-implemented method of claim 1, the method further comprising retrieving metadata of a database containing the respective table, wherein the metadata comprises at least one of: (i) a database name, (ii) a schema name, (iii) a plurality of table names, (iv) record counts, and (v) column names.

5. The computer-implemented method of claim 1, wherein determining that an indirect relationship exists between the respective table and the second one or more concepts in the ontology comprises:

for each business term defined as a transcoding table in the business glossary:

searching an ontology graph to find a first concept node that matches the business term definition;

performing a directed search on the ontology graph from the first concept node to discover the second concept node containing semantic values matching a description of the respective table; and calculating the path length between the first concept node and the second concept node.

6. The computer-implemented method of claim 5, wherein the score reflecting the greater likelihood that the respective table is a transcoding table is assigned to the respective table upon determining at least one of:

that the percentage of matches between the semantic values in the first concept and the values in the respective table is greater than a predetermined value; and that the path length to from the first concept node to the second concept node is lower than a predetermined value.

7. A computer program product for detecting transcoding tables in an extract-transform-load data integration process, the computer program product comprising:

a non-transitory computer-readable storage medium having computer-readable program code embodied therewith, the computer-readable program code comprising:

computer-readable program code configured to activate transcoding table detection in the ETL process;

computer-readable program code configured to identify records passing through an operator whose values are being replaced with values from at least one table linked to the operator before being sent to an output table, wherein the operator specifies an operation for extracting, transforming, or loading data stored in one or more source systems into storage of a target system;

computer-readable program code configured to add the at least one table linked to the operator to a list of candidate tables;

computer-readable program code configured to determine whether each table in the list of candidate tables a first table linked to the operator is a transcoding table by assigning, to each respective table in the list of candidate the first tables, a score reflecting a greater likelihood that the respective table is a transcoding table upon determining at least one of:

that a business term in a business glossary defines the respective table as a transcoding table;

that a first concept in a predefined ontology contains semantic values matching values in the respective table; and that an indirect relationship exists between the respective table and a second concept in the ontology;

wherein the transcoding table is used to harmonize values from a plurality of tables in the one or more source systems to a table in the target system.

8. The computer program product of claim 7, wherein the computer-readable program code further comprises:

computer-readable program code configured to, upon determining that the respective table is a transcoding table based on the score exceeding a predetermined threshold, load the respective table into a data store.

9. The computer program product of claim 7, wherein the computer-readable program code further comprises:

computer-readable program code configured to present the respective table to a user; and computer-readable program code configured to, upon receiving user input specifying that the respective table is a transcoding table, load the respective table into a data store.

10. The computer program product of claim 7, the computer-readable program code further comprising:

computer-readable program code configured to retrieve metadata of a database containing the respective table, wherein the metadata comprises at least one of: (i) a database name, (ii) a schema name, (iii) a plurality of table names, (iv) record counts, and (v) column names.

11. The computer program product of claim 10, wherein determining that an indirect relationship exists between the respective table and the second one or more concepts in the ontology comprises:

for each business term defined as a transcoding table in the business glossary:

searching an ontology graph to find a first concept node that matches the business term definition;

performing a directed search on the ontology graph from the first concept node to discover the second concept node containing semantic values matching a description of the respective table; and calculating the path length between the first concept node and the second concept node.

12. The computer program product of claim 11, wherein the score reflecting the greater likelihood that the respective table is a transcoding table is assigned to the respective table upon determining at least one of:

that the percentage of matches between the semantic values in the first concept and the values in the respective table is greater than a predetermined value; and that the path length to from the first concept node to the second concept node is lower than a predetermined value.

13. A system, comprising:

one or more computer processors; and a memory containing a program, which when executed by the one or more computer processors is configured to perform an operation for detecting transcoding tables in an extract-transform-load data integration process, the operation comprising:
  activating transcoding table detection in the ETL process;
  identifying, by operation of one or more computer processors, records passing through an operator configured to replace values in the records with values from at least one table linked to the operator before being sent to an output table, wherein the operator specifies an operation for extracting, transforming, or loading data stored in one or more source systems into storage of a target system;
  adding the at least one table linked to the operator to a list of candidate tables;
  determining whether each table in the list of candidate tables is a transcoding table by assigning, to each respective table in the list of candidate, a score reflecting a greater likelihood that the respective table is a transcoding table upon determining at least one of:
    that a business term in a business glossary defines the respective table as a transcoding table;
    that a first concept in a predefined ontology contains semantic values matching values in the respective table; and
    that an indirect relationship exists between the respective table and a second concept in the ontology;
  wherein the transcoding table is used to harmonize values from a plurality of tables in the one or more source systems to a table in the target system.

14. The system of claim 13, the operation further comprising:
  upon determining that the respective table is a transcoding table based on the score exceeding a predetermined threshold, loading the respective table into a data store.

15. The system of claim 13, the operation further comprising:
  presenting the respective table to a user; and
  upon receiving user input specifying that the respective table is a transcoding table, loading the respective table into a data store.

16. The system of claim 13, the operation further comprising retrieving metadata of a database containing the respective table, wherein the metadata comprises at least one of: (i) a database name, (ii) a schema name, (iii) a plurality of table names, (iv) record counts, and (v) column names.

17. The system of claim 13, wherein determining that an indirect relationship exists between the respective table and the second one or more concepts in the ontology comprises:
  for each business term defined as a transcoding table in the business glossary:
    searching an ontology graph to find a first concept node that matches the business term definition;
    performing a directed search on the ontology graph from the first concept node to discover the second concept node containing semantic values matching a description of the respective table; and
    calculating the path length between the first concept node and the second concept node.

18. The system of claim 17, wherein the score reflecting the greater likelihood that the first table is a transcoding table is assigned to the first table upon determining at least one of:
  that the percentage of matches between the semantic values in the first concept and the values in the respective table is greater than a predetermined value; and
  that the path length to from the first concept node to the second concept node is lower than a predetermined value.

* * * * *